(12) United States Patent
Frank et al.

(10) Patent No.: US 7,680,832 B1
(45) Date of Patent: Mar. 16, 2010

(54) TECHNIQUES FOR MANAGING CONFIGURATION INFORMATION AMONG DIFFERENT PHYSICAL DEVICES

(75) Inventors: Joseph Frank, Boulder, CO (US); Brian Foster, Haverhill, MA (US); Pareeja Vivek, San Jose, CA (US); Brian R. Gruttadauria, Sutton, MA (US)

(73) Assignee: EMC Corporation, Hopkinton, MA (US)

( * ) Notice: Subject to any disclaimer, the term of this patent is extended or adjusted under 35 U.S.C. 154(b) by 444 days.

(21) Appl. No.: 11/824,431

(22) Filed: Jun. 29, 2007

(51) Int. Cl.
*G06F 17/30* (2006.01)
(52) U.S. Cl. ...................... 707/200; 717/163
(58) Field of Classification Search .............. 707/200, 707/205; 717/163
See application file for complete search history.

(56) References Cited

U.S. PATENT DOCUMENTS

| 7,028,306 | B2 | 4/2006 | Boloker et al. | |
|---|---|---|---|---|
| 7,114,147 | B2 | 9/2006 | Ballantyne et al. | |
| 7,210,097 | B1 | 4/2007 | Clarke et al. | |
| 7,340,728 | B2 | 3/2008 | Kutter | |
| 7,580,950 | B2 * | 8/2009 | Kavuri et al. | 707/103 R |
| 2008/0008202 | A1 * | 1/2008 | Terrell et al. | 370/401 |
| 2008/0028401 | A1 * | 1/2008 | Geisinger | 718/1 |

* cited by examiner

*Primary Examiner*—Leslie Wong
(74) *Attorney, Agent, or Firm*—BainwoodHuang

(57) ABSTRACT

A technique involves managing configuration information used by an application. The technique involves disposing a first file in a first physical device. The first file includes first configuration information. The technique further involves disposing a second file in a second physical device. The second file includes second configuration information. The second physical device is different than the first physical device. The technique further involves providing access to a top level file having a first path string to the first file in the first physical device and a second path string to the second file in the second physical device. The top level file in combination with the first and second files operates as a single virtual document which includes the first configuration information of the first file and the second configuration information of the second file.

20 Claims, 5 Drawing Sheets

TECHNIQUES FOR MANAGING CONFIGURATION INFORMATION AMONG DIFFERENT PHYSICAL DEVICES

BACKGROUND

Extensible Markup Language (XML) is a markup language which was developed by the World Wide Web Consortium (W3C). A traditional XML document has an .xml file extension, and typically includes XML tags which are defined by the document's author. Such a document enables the author to describe data in a manner that complements, but does not replace, Hyper Text Markup Language (HTML) which is commonly used for web pages.

In a typical XML document, opening and closing tags delimit elements. In particular, each XML document contains a root element, and other elements nested within this root element. Furthermore, parent elements can have child (or sub) elements which are nested within these parent elements.

A variety of tools exist which enable the author to navigate through an XML document. For example, the XML Document Object Model (XML DOM) defines a standard way to access and manipulate XML documents. In particular, the XML DOM presents an XML document as an inverted tree having elements, attributes and text defined as nodes of the inverted tree. The author is capable of traversing and accessing components within the XML document using a set of standard functions.

SUMMARY

Unfortunately, accessing components within XML documents using an XML DOM and a set of standard functions is awkward and cumbersome. For example, accessing a single data element requires traversing the inverted tree and making numerous function calls, even if only a single item of data is needed. Such an approach is prone to error due to the number of steps required. Moreover, an attempt to group data into separately maintained files would prove to be extremely costly in terms of the number of function calls and the effort needed to carry this out.

In contrast to conventional approaches, improved techniques manage configuration information within separate files residing on different physical devices (or memory partitions), but enable a user to view these separate files as a single virtual document (e.g., a general purpose configuration library) without having to change the method of accessing the information for each physical device. In particular, such techniques enable the use of an application programming interface (API) having standard function calls which reference the files using unique path strings. Accordingly, most information can be accessed using a single simple function call regardless of where the information is stored (e.g., hard disk, flash memory, volatile semiconductor memory, etc.) or how it is actually retrieved (e.g., from a local drive, from main memory, over the Internet, etc.). As a result, the configuration information is easily accessible via particular path strings.

One embodiment is directed to a technique which involves managing configuration information used by an application. The technique involves disposing a first file in a first physical device (e.g., SDRAM). The first file includes first configuration information. The technique further involves disposing a second file in a second physical device (e.g., flash memory). The second file includes second configuration information. The second physical device is different than the first physical device. The technique further involves providing access to a top level file (e.g., stored on disk) having a first path string to the first file in the first physical device and a second path string to the second file in the second physical device. The top level file in combination with the first and second files operates as a single virtual document which includes the first configuration information of the first file and the second configuration information of the second file. Such a technique can be built on top of XML while nevertheless preserving the flexibility and standards-based approach of an XML configuration file.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

An improve technique involves managing configuration information within separate files residing on different physical devices (or memory partitions), but enables a user to view these separate files as a single virtual document (e.g., a general purpose configuration library) without having to change the method of accessing the information for each physical device. In particular, such a technique enables the use of an application programming interface (API) having standard function calls which reference the files using unique path strings. Accordingly, most information is accessible using a single simple function call regardless of where the information is stored (e.g., hard disk, flash memory, volatile semiconductor memory, etc.) or how it is actually retrieved (e.g., from a local drive, from main memory, over the Internet, etc.). Thus, the configuration information is easily accessible via particular path strings.

Figure 1:
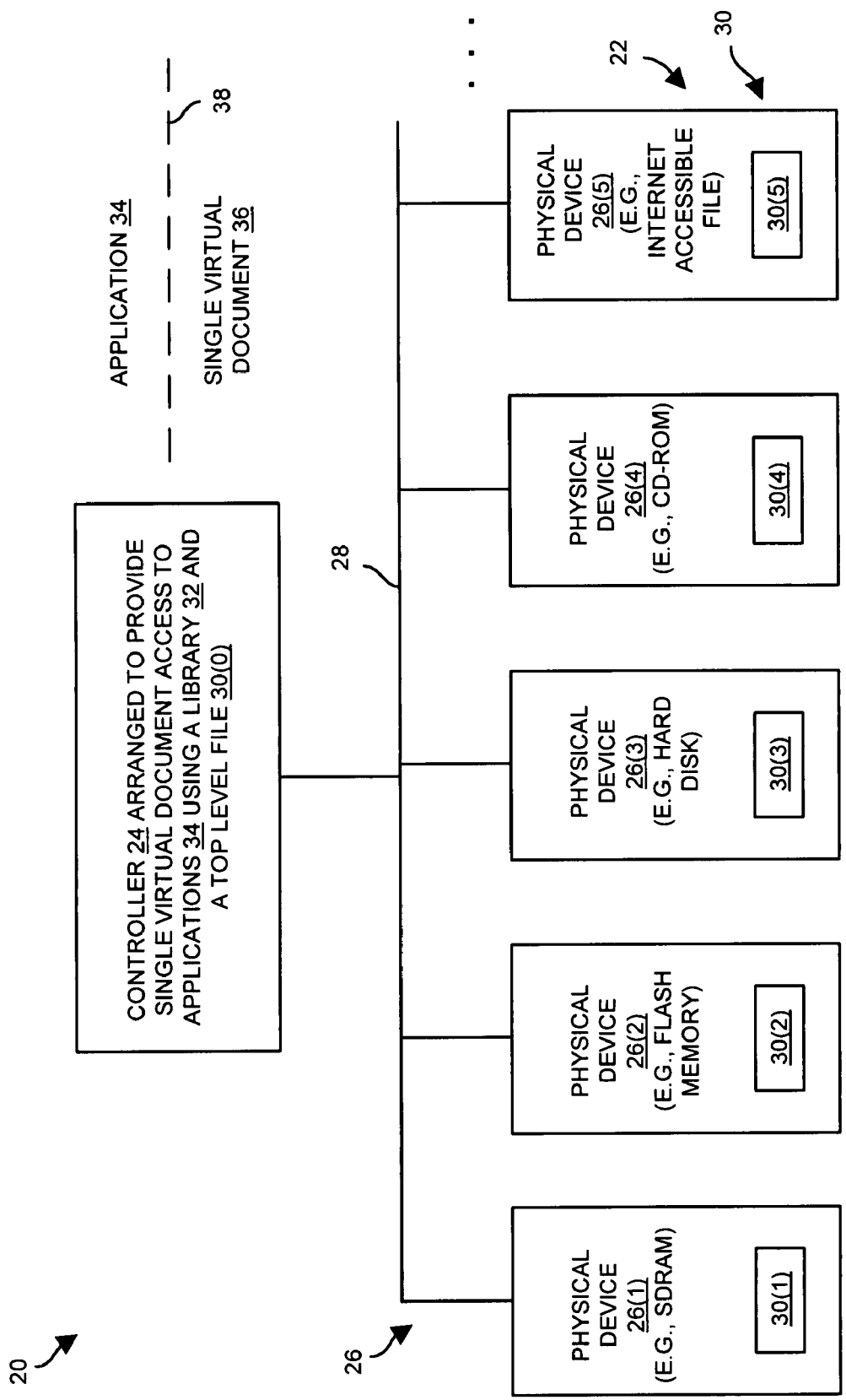
FIG. 1 is a block diagram of a system which manages configuration information among different physical devices.

FIG. 1 shows a system 20 which is arranged to manage configuration information 22. The system 20 includes a controller 24, multiple physical devices 26(1), 26(2), . . . (collectively, physical devices 26), and a communications medium 28 (e.g., buses, cables, a computer network, wireless transmissions, combinations thereof, etc.) that connects the controller 24 to the devices 26. The configuration information 22 resides in multiple files 30(1), 30(2), . . . which are distributed across the devices 26.

By way of example, the device 26(1) includes volatile semiconductor memory (e.g., SDRAM) having a configuration file 30(1). The device 26(2) includes flash memory configuration file 30(2). The device 26(3) includes magnetic disk drive memory configuration file 30(3). The device 26(4) includes CD-ROM memory configuration file 30(4). The device 26(5) includes Internet accessible memory (e.g., a remote computer, a storage appliance, etc.) configuration file 30(5). The system 20 is capable of including other memory-based physical devices 26 having additional files 30 as well such as magnetic tape devices, DVD readers/writers, disk arrays, floppy drives, mirrored storage, combinations thereof, etc.

A top level file 30(0) links to the multiple files 30(1), 30(2), . . . (collectively, files 30) using respective path strings. A path string is a string of characters which uniquely identifies a particular file 30 on a particular device 26. A suitable format for a path string is the format "/xxx/yyy/zzz" wherein "/" is a separator, "xxx" and "yyy" are elements, and "zzz" is an attribute. The top level file 30(0) can reside within any of the devices 26 (e.g., the hard disk device 26(3)). Upon initialization of a library 32 with the top level file 30(0), the system 20 is able to provide access to the configuration information 22 by presenting the files 30 to an application 34 as a single virtual document 36 (e.g., a single virtual configuration file), and allowing the application 34 to store and retrieve the configuration information 22 via an API 38 (i.e., the API is illustrated by the dashed line 38 in FIG. 1).

It should be understood that the configuration information 22 on each physical device 26 is capable of being tailored to the memory characteristics of that device 26. Along these lines, suppose that the controller 24 is implemented using the processing circuitry of a computer (i.e., one or more processors running code). In this example, the particular configuration information 22 in the file 30(1) of the volatile semiconductor memory of the physical device 26(1) enjoys quick accessibility (e.g., fast reads and writes). Additionally, the particular configuration information 22 stored in the file 30(3) on the magnetic disk drive memory of the physical device 26(3) enjoys non-volatility and may be rather sizable without greatly consuming other computer resources (e.g., main memory which is thus available for other uses). Furthermore, the particular configuration information 22 stored in the file 30(2) of a flash memory read-only partition of the physical device 26(2) is accessible in a manner that is faster than disk drive access times but also safe since the read-only partition prevents the configuration information 22 within the file 30(2) from being changed. Further details will now be provided with reference to FIG. 2.

Figure 2:
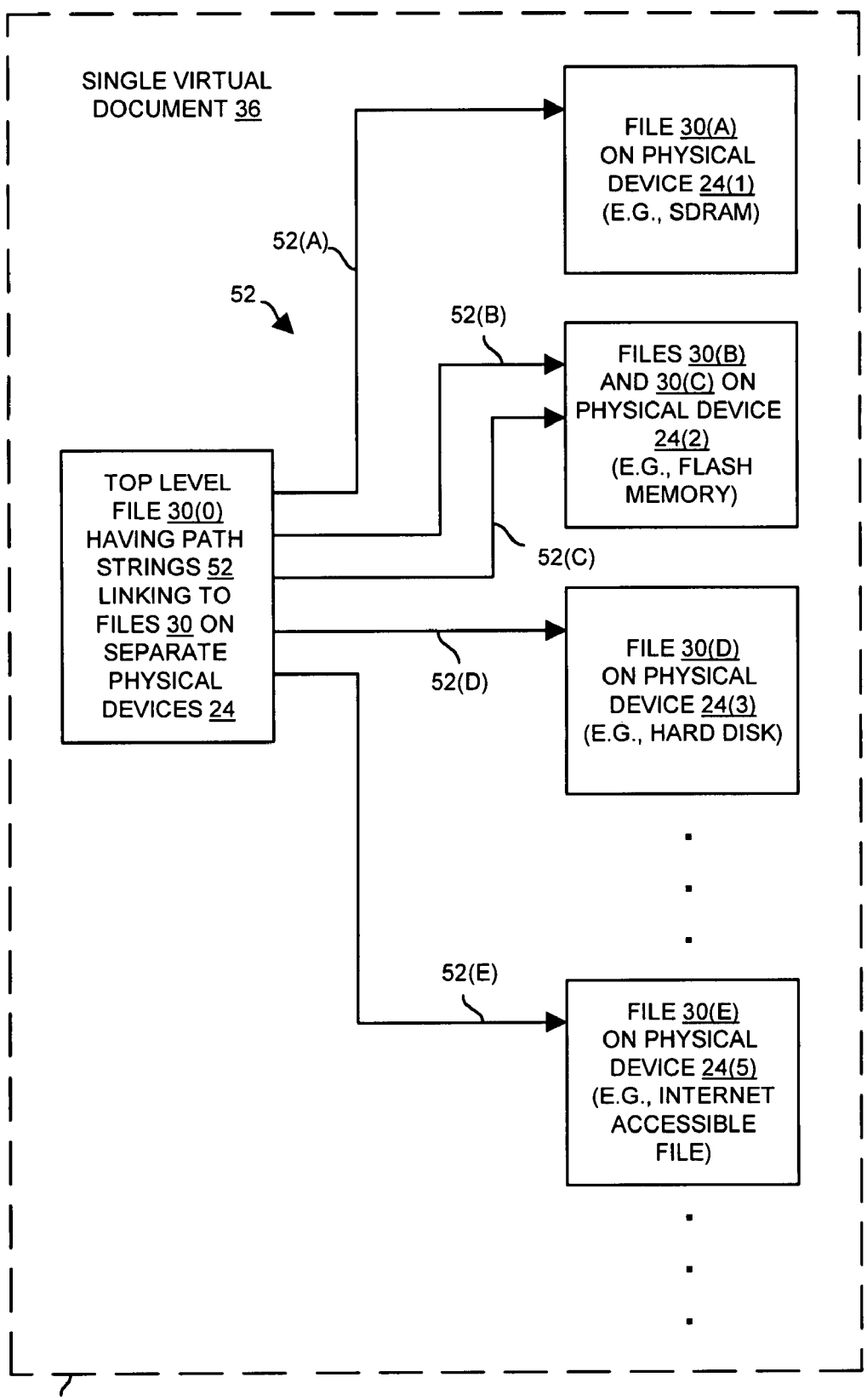
FIG. 2 is a logical diagram of a single virtual document formed by multiple files distributed within the system of FIG. 1.

FIG. 2 is a logical diagram 50 of the single virtual document 36 formed by the files 30 which are distributed among the various physical devices 26 of the system 20. As mentioned earlier, the top level file 30(0) includes path strings 52 uniquely identifying the respective files 30 on the separate physical devices 26.

At this point, it should be understood that each file 30 is preferably a separate XML document stored in the memory of a particular physical device 26. Due to the high level flexibility and extensibility provided by XML as well as XML's ability to be used with standard parsing libraries, XML documents are well-suited for use as the files 30. To further illustrate the path string features of the system 20, the following example will now be provided in the context of XML documents as the files 30.

In some arrangements, a library 32 parses the XML on input and formats the XML for output. An external method is capable of identifying the root configuration file (e.g., "file.conf"). On input, the entire top level file 30(0) is read into memory. However, the secondary files 30(1), 30(2), . . . are read as they are accessed in the tree.

Figure 3:
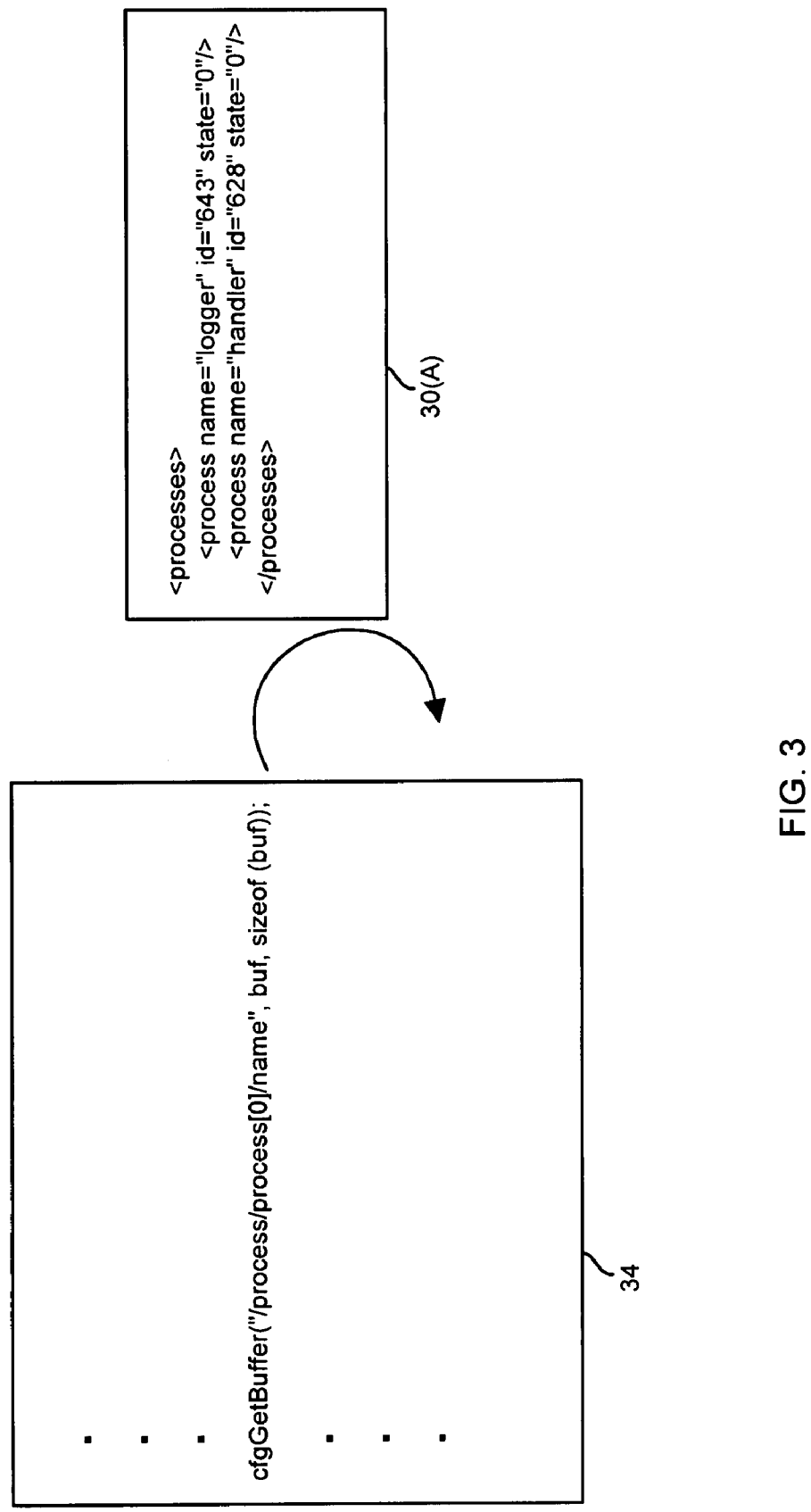
FIG. 3 is a block diagram illustrating a read operation carried out by a read function call in accordance with an API offered by the system of FIG. 1.
Figure 4:
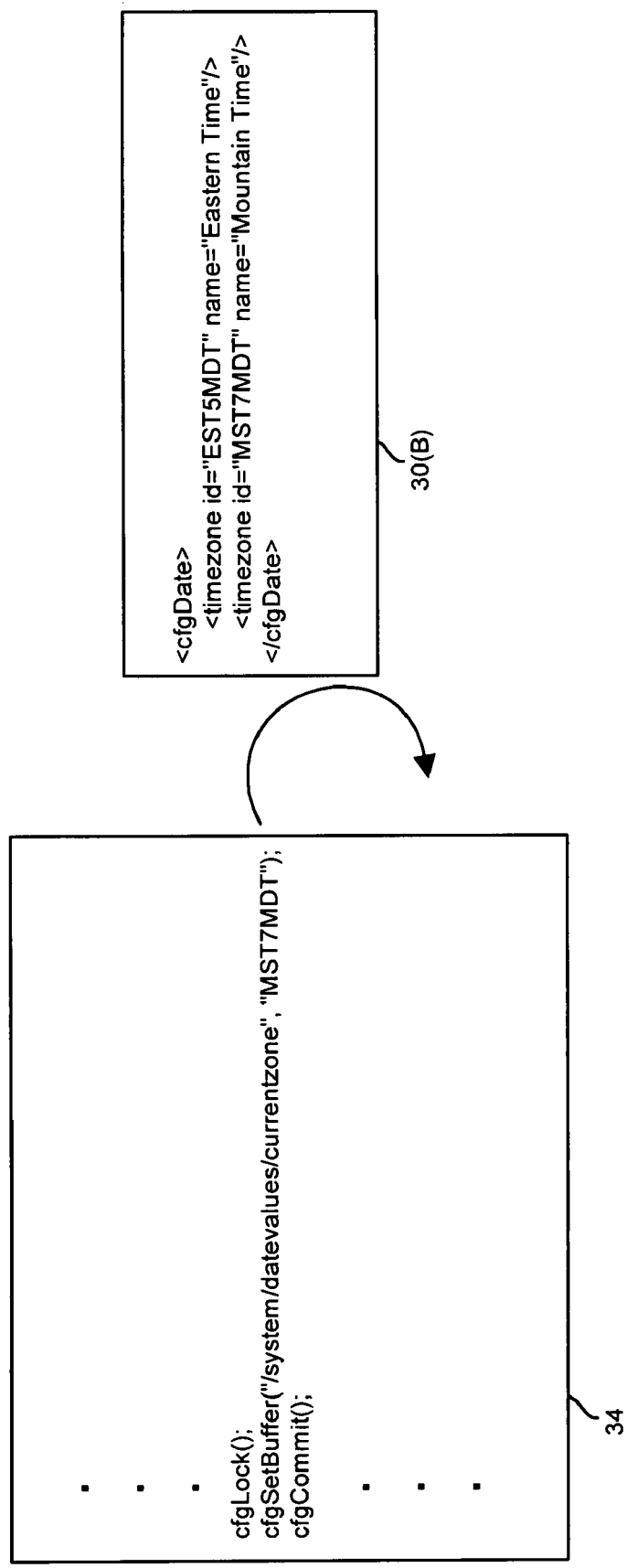
FIG. 4 is a block diagram illustrating a write operation carried out by a write function call in accordance with the API offered by the system of FIG. 1.

The following example will now be provided with reference to FIGS. 1-4. FIGS. 3 and 4 illustrate how a user is able to access certain configuration information 22 with extremely simple function calls that alleviate the need for extensive, complex and burdensome device-specific considerations.

Suppose that we want to organize configuration information 22 into broad categories such as processes, system, and administrators. The API 38 of the system 20 is capable of providing configuration information 22 using simple standard function calls such as cfgGetBuffer( ) to read configuration information 22 from the files 30 within the system 22, and cfgSetBuffer( ) to write configuration information 22 to the files 30 within the system 22. The system 20 is arranged to support these function calls regardless of the particular type of device or memory partition thus enabling users (e.g., developers) the freedom to access configuration information 22 without having to change the method of accessing the information for each physical device as in conventional approaches to managing configuration data. Rather, the function calls provided by the API 38 enable the users to carryout access to any and all of the files 30 via particular path strings 52.

Along these lines, suppose that the file 30(1) is stored in main memory, i.e., the physical device 24(1), and contains information about active processes. Here, by way of example, the file 30(A) is given the filename cfgprocess.xml and is accessible using the path string 52(A) "/tmp/cfgprocess.xml". The system 20 populates the file 30(A) with the active process information as each process starts. By way of example, the contents of the file 30(A) are as follows.

<processes>
  <process name="logger" id="643" state="0"/>
  <process handler="logger" id="622" state="0"/>
</processes>

Additionally, suppose that the file 30(B) is stored in a read-only partition of flash memory, i.e., the physical device 24(2), and contains information about available time zones. Here, by way of example, the file 30(B) is given the filename cfgdate.xml and is accessible using the path string 52(B) "/mnt/flash0/cfgdate.xml". The system 20 reliably stores this information in a safe manner since the file 30(B) resides in a read-only partition. By way of example, the contents of the file 30(B) are as follows.

<cfgdate>
  <timezone id="EST5MDT" name="Eastern Time"/>
  <timezone id="MST5MDT" name="Mountain Time"/>
</cfgdate>

In contrast, suppose that the file 30(C) is stored in a read/write partition of the flash memory, i.e., the physical device 24(2), and contains current time zone information for the system 20. Here, by way of example, the file 30(C) is given the filename cfgdateval.xml and is accessible using the path string 52(C) "/mnt/flash1/cfgdateval.xml". The system 20 stores this currently selected time zone information in the file 30(C) are as follows.

<cfgdateval currentzone="MST7MDT"/>

At this point, it should be understood that the top level file 30(0) conveniently includes path strings 52(A), 52(B), 52(C) to respective files 30(A), 30(B), and 30(C). The top level file is further capable of providing access to configuration information 22 in other files 30(D), 30(E) on other devices 26 (hard disks, Internet accessible files, etc.) using other path strings 52(D), 52(E), and so on. In this example, the top level file 30(0) looks like this:

<config>
  <process _File_="tmp/cfgprocess.xml"/>
  <system name="My System">

```
<dateoptions _File_="/mnt/flash0/cfgdate.xml"/>
<datevalues _File_="/mnt/flash1/cfgdate.xml"/>
</system>
<admins>
<admin name="joe"/>
<admin name="brian"/>
</admins>
```
</config>

Based on the above-provided example details, one will appreciate that an application 34 is capable of the accessing the configuration information 22 without the complexities of traversing the files using an XML DOM and numerous function calls as would be required in a conventional approach. Rather, the system 20 offers access to the configuration information 22 via simple function calls.

For example, the following command is capable of providing a system name to the application 34:

cfgGetBuffer("/system/name", buf, sizeof(buf));

As shown above, name references are simply paths.

As another example and as illustrated in FIG. 3, the following command provides a process name to the application 34:

cfgGetBuffer("/processes/process[0]/name", buf, sizeof (buf));

Again, the type of memory storing the file 30(A) and the particular physical device 26 on which the file 30(A) is stored is transparent to the user.

As yet another example and as illustrated in FIG. 4, the following commands enable a user to set the current time zone.

cfgLock( );
cfgSetBuffer("/system/datevalues/currentzone", buf, sizeof (buf));
cfgCommit( );

The cfgLock( ) and cfgCommit( ) commands reliably enable the configuration information 22 to be set without other threads or processes intervening. In particular, the command cfgLock( ) obtains a lock on the top level file and the file 30(B) being changed (i.e., cfgdateval.xml), the command cfgSetBuffer( ) sets the current time zone information within the cfgdateval.xml file, and the command cfgCommit( ) writes the appropriate data and releases the file locks.

As described above, the configuration information 22 is accessible by the user through the API 38 without concern over device-specific details that would otherwise increase the burden on the user and the likelihood of error. It should be understood that the configuration information 22 can even be disposed remotely and transparently on a remote physical device (e.g., another computer, see the device 26(5) in FIG. 2). A summary of procedure performed by the system 20 will now be provided with reference to FIG. 5.

Figure 5:
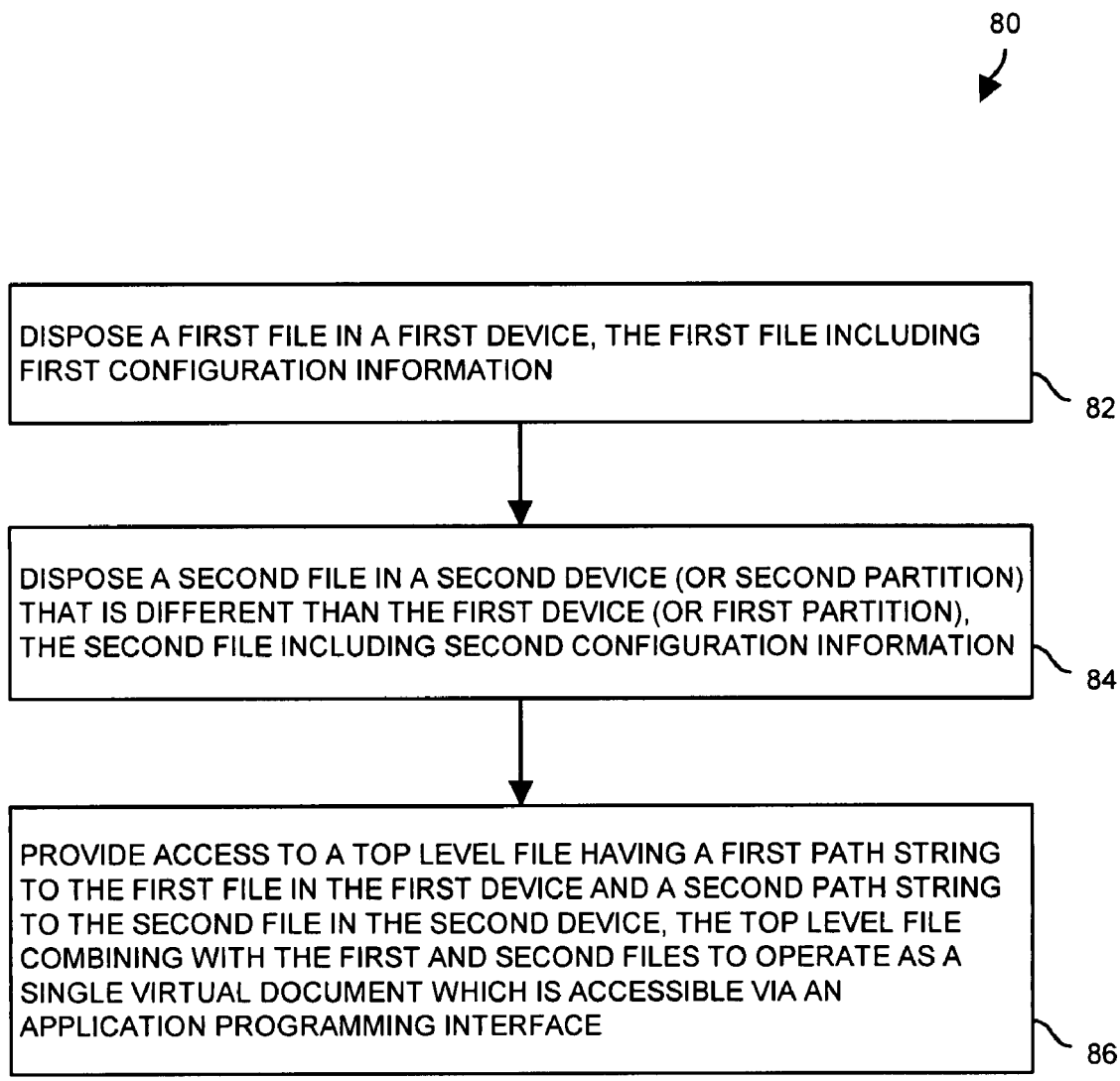
FIG. 5 is a flowchart of a procedure which is performed by a controller of the system of FIG. 1.

FIG. 5 is a flowchart of a procedure 80 which is performed by the controller 24 of the system 20. In step 82, the controller 24 disposes a first file in a first physical device, the first file including first configuration information. For instance, in the above-provided example, the controller 24 handles management of the active process information stored in main memory.

In step 84, the controller 24 disposes a second file in a second physical device, the second file including second configuration information. Again, in the above-provided example, the controller 24 handles management of the time zone information stored in flash memory.

In step 86, the controller 24 provides access to a top level file having a first path string to the first file in the first physical device and a second path string to the second file in the second physical device. Conveniently, the top level file in combination with the first and second files operate as a single virtual document which includes the first configuration information of the first file and the second configuration information of the second file. In the above-provided example, the user is able to subsequently access the process and time zone information using simple function calls provided by the API 38 as if the user were simply accessing a single virtual document.

As described above, an improve technique involves managing configuration information 22 within separate files 30 residing on different physical devices 26 (or memory partitions), but enables the user to view these separate files 30 as a single virtual document 36 without having to change the method of accessing the information for each physical device 26 (see the logical diagram 50 in FIG. 2). In particular, such a technique enables the use of an API 38 having standard function calls which reference the files 30 using unique path strings 52. Accordingly, most information is accessible using a single simple function call regardless of where the information is stored (e.g., hard disk, flash memory, volatile semiconductor memory, etc.) or how it is actually retrieved (e.g., from a local drive, from main memory, over the Internet, etc.). Therefore, the configuration information 22 is easily accessible via particular path strings 52.

While various embodiments of the invention have been particularly shown and described, it will be understood by those skilled in the art that various changes in form and details may be made therein without departing from the spirit and scope of the invention as defined by the appended claims.

For example, the devices 26 were described above as being separate physical devices for illustration purposes. It should be understood that the various file locations can be separate partitions, e.g., the application (read-only) partition, the flash read-write partition, the "/tmp" memory partition, the RAID set read-write partition, and so on.

Additionally, the system 20 was described above as using XML documents as the files 30 by way of example only. Other types of files are suitable for use as well such as Extensible Hypertext Markup Language (XHTML), RSS, and Atom, among others.

What is claimed is:

1. A method of managing configuration information used by an application, the method comprising:
    disposing a first file in a first physical device, the first file including first configuration information;
    disposing a second file in a second physical device, the second file including second configuration information, the second physical device being different than the first physical device; and
    providing access to a top level file having a first path string to the first file in the first physical device and a second path string to the second file in the second physical device, the top level file in combination with the first and second files operating as a single virtual document which includes the first configuration information of the first file and the second configuration information of the second file.

2. The method as in claim 1 wherein providing access to the top level file includes:
    initializing a library with the top level file to provide the application with function call access to the first configuration information of the first file in the first physical device and the second configuration information of the second file in the second physical device via a configuration application programming interface (API).

3. The method as in claim 2 wherein the first physical device stores the first file in a first type of physical memory; and
wherein the second physical device stores the second file in a second type of physical memory which is different than the first type of physical memory.

4. The method as in claim 3 wherein the first file is a first Extensible Markup Language (XML) document having the first configuration information in XML code format;
wherein the second file is a second XML document having the second configuration information in XML code format; and
wherein the top level file is a top level XML document having the first path string to the first file and the second path string to the second file in XML code format.

5. The method as in claim 4, further comprising:
reading a value in the first file using a function call of the configuration API which identifies the first file by the first path string to the first file in the first device.

6. The method as in claim 4, further comprising:
(i) obtaining a file lock, (ii) setting a value in the first file using a function call of the configuration API, the first function call identifying the first file by the first path string to the first file in the first device, and (iii) releasing the file lock.

7. The method as in claim 4, further comprising:
providing read-only access to the first type of physical memory, and read-and-write access to the second type of physical memory.

8. The method as in claim 4, further comprising:
disposing the top level file in a third type of physical memory;
wherein the first type of physical memory is non-volatile semiconductor memory;
wherein the second type of physical memory is volatile semiconductor memory; and
wherein the third type of physical memory is volatile semiconductor memory is magnetic disk drive memory.

9. The method as in claim 4, further comprising:
disposing another XML document having other configuration information in XML code format in a remote physical device which is accessible through the Internet; and
adding another path string to the top level file to enable the application to access to the other configuration information through the Internet using the API after initialization of the library with the top level file.

10. A system of managing configuration information used by an application, the system comprising:
a first physical device which stores a first file having first configuration information;
a second physical device which stores a second file having second configuration information; and
a controller coupled to the first physical device and the second physical device, the controller being arranged to provide access to a top level file having a first path string to the first file stored in the first physical device and a second path string to the second file stored in the second physical device, the top level file in combination with the first and second files operating as a single virtual document which includes the first configuration information of the first file and the second configuration information of the second file.

11. The system as in claim 10 wherein the controller, when providing access to the top level file, is arranged to:
initialize a library with the top level file to provide the application with function call access to the first configuration information of the first file in the first physical device and the second configuration information of the second file in the second physical device via a configuration application programming interface (API).

12. The system as in claim 11 wherein the first physical device stores the first file in a first type of physical memory; and
wherein the second physical device stores the second file in a second type of physical memory which is different than the first type of physical memory.

13. The system as in claim 12 wherein the first file is a first Extensible Markup Language (XML) document having the first configuration information in XML code format;
wherein the second file is a second XML document having the second configuration information in XML code format; and
wherein the top level file is a top level XML document having the first path string to the first file and the second path string to the second file in XML code format.

14. The system as in claim 13 wherein the controller is further arranged to:
read a value in the first file using a function call of the configuration API which identifies the first file by the first path string to the first file in the first device.

15. The system as in claim 13 wherein the controller is further arranged to:
(i) obtain a file lock, (ii) set a value in the first file using a function call of the configuration API, the first function call identifying the first file by the first path string to the first file in the first device, and (iii) release the file lock.

16. The system as in claim 13 wherein the configuration API has read-only access to the first type of physical memory, and read-and-write access to the second type of physical memory.

17. The system as in claim 13 wherein the top level file is disposed in a third type of physical memory;
wherein the first type of physical memory is non-volatile semiconductor memory;
wherein the second type of physical memory is volatile semiconductor memory; and
wherein the third type of physical memory is volatile semiconductor memory is magnetic disk drive memory.

18. The system as in claim 13, further comprising:
a remote physical device which is coupled to the controller through a computerized network, the remote physical device storing another XML document having other configuration information in XML code format; and
wherein the top level file further has another path string to the other XML document stored in the remote physical device to provide the application with function call access to the other configuration information.

19. A computer program product comprising a computer-readable medium having computer readable instructions recorded thereon to manage configuration information used by an application, the computer readable instructions being operative, when performed by a computerized device, to cause the computerized device to:
dispose a first file in a first physical device, the first file including first configuration information;
dispose a second file in a second physical device, the second file including second configuration information, the second physical device being different than the first physical device; and
provide access to a top level file having a first path string to the first file in the first physical device and a second path string to the second file in the second physical device, the top level file in combination with the first and second files operating as a single virtual document which includes the first configuration information of the first file and the second configuration information of the second file.

20. The computer program product as in claim 19 wherein providing access to the top level file includes:

initializing a library with the top level file to provide the application with function call access to the first configuration information of the first file in the first physical device and the second configuration information of the second file in the second physical device via a configuration application programming interface (API);

wherein the first physical device stores the first file in a first type of physical memory;

wherein the second physical device stores the second file in a second type of physical memory which is different than the first type of physical memory;

wherein the first file is a first Extensible Markup Language (XML) document having the first configuration information in XML code format;

wherein the second file is a second XML document having the second configuration information in XML code format; and wherein the top level file is a top level XML document having the first path string to the first file and the second path string to the second file in XM code format.

\* \* \* \* \*